(12) United States Patent
Rodriquez et al.

(10) Patent No.: US 7,288,028 B2
(45) Date of Patent: Oct. 30, 2007

(54) METHOD AND APPARATUS FOR QUICKLY JOINING AN ONLINE GAME BEING PLAYED BY A FRIEND

(75) Inventors: Mario A. Rodriquez, Redmond, WA (US); Michael T. Yriondo, Duvall, WA (US); Tyron Michael Balascio, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/671,993

(22) Filed: Sep. 26, 2003

(65) Prior Publication Data

US 2005/0070359 A1    Mar. 31, 2005

(51) Int. Cl.
*A63F 13/12* (2006.01)
*G06F 19/00* (2006.01)
(52) U.S. Cl. .............................. 463/42; 463/40; 463/41; 709/203; 709/204; 709/205
(58) Field of Classification Search ............ 463/40–42, 463/1, 29; 709/203–205, 227; 725/37, 46, 725/52, 141
See application file for complete search history.

(56) References Cited

U.S. PATENT DOCUMENTS

| | | | | |
|---|---|---|---|---|
| 5,558,339 A | * | 9/1996 | Perlman ..................... | 463/42 |
| 5,586,257 A | * | 12/1996 | Perlman ..................... | 463/42 |
| 5,828,843 A | * | 10/1998 | Grimm et al. .............. | 709/228 |
| 5,894,556 A | * | 4/1999 | Grimm et al. .............. | 709/227 |
| 5,956,485 A | * | 9/1999 | Perlman ..................... | 709/204 |
| 6,128,660 A | * | 10/2000 | Grimm et al. .............. | 709/227 |
| 6,134,590 A | * | 10/2000 | Perlman ..................... | 709/228 |
| 6,301,609 B1 | * | 10/2001 | Aravamudan et al. ...... | 709/207 |
| 6,345,297 B1 | * | 2/2002 | Grimm et al. .............. | 709/227 |
| 6,352,479 B1 | * | 3/2002 | Sparks, II ................... | 463/42 |
| 6,651,086 B1 | * | 11/2003 | Manber et al. ............. | 709/205 |
| 6,699,125 B2 | * | 3/2004 | Kirmse et al. .............. | 463/42 |
| 6,821,205 B2 | * | 11/2004 | Takahashi et al. .......... | 463/42 |
| 6,874,029 B2 | * | 3/2005 | Hutcheson et al. ......... | 709/227 |
| 7,056,217 B1 | * | 6/2006 | Pelkey et al. ................ | 463/43 |
| 7,113,975 B2 | * | 9/2006 | Nakayama et al. ......... | 709/204 |
| 7,240,093 B1 | * | 7/2007 | Danieli et al. .............. | 709/205 |
| 2002/0086732 A1 | * | 7/2002 | Kirmse et al. .............. | 463/42 |
| 2002/0160838 A1 | * | 10/2002 | Kim ............................ | 463/42 |
| 2004/0127289 A1 | * | 7/2004 | Davis et al. ................. | 463/42 |
| 2004/0251517 A1 | * | 12/2004 | Nakashima ................. | 257/565 |
| 2006/0178216 A1 | * | 8/2006 | Shea et al. ................... | 463/42 |

* cited by examiner

*Primary Examiner*—John M. Hotaling, II
*Assistant Examiner*—Meagan Thomasson
(74) *Attorney, Agent, or Firm*—Workman Nydegger (57) ABSTRACT

The user who has signed onto an online gaming service can be immediately joined in playing an instance of a game with a friend appearing in the user's friends list. After signing onto the online service, the user has the option to select "Quick Join," causing the online service to immediately join the user in an instance of the game having an opening for the user and also being played by the first player found in the friends list. Alternatively, the user may selectively display the friends list and select a specific friend who is online, before activating the Quick Join option to immediately join in playing within the friend's game. Depending upon the type of game, the user will either be immediately placed into play or joined to a portion of the game that enables the user to select options, so that the user can participate in the next session of the game.

8 Claims, 7 Drawing Sheets

METHOD AND APPARATUS FOR QUICKLY JOINING AN ONLINE GAME BEING PLAYED BY A FRIEND

FIELD OF THE INVENTION

This invention generally pertains to a method and system that enable a person to quickly join in playing an online game that is being played over a network, and more specifically, pertains to enabling a person to quickly join a friend in playing a game over the network by activating a "Quick Join" control.

BACKGROUND OF THE INVENTION

Participation in online electronic games is an increasingly popular pastime. Online game play permits players to interact with many more players than is typically possible when play is limited to those using the same game console. Online game players also benefit from the diverse social interaction that results from playing with a much larger pool of friends. Although playing online games with strangers can also be interesting, a player will often prefer to play with people who are actually known to the player in the "real world," or are participants in online gaming who the player has found to be compatible during previous sessions of online game play. A player may choose to play a specific game with a friend or group of friends, and depending upon the nature of the game, the friends may compete individually against each other, or be on the same team, or members of competitive teams.

Microsoft Corporation's XBOX LIVE™ gaming service provides several options for a subscriber of the service to enter into online game play after signing onto the service. Currently, by selecting an "OptiMatch option," it is possible for a user of this online gaming service to join an online game that meets various criteria specified by the user. If the user just wants to play a game immediately, the player can select a "QuickMatch" option, and in response, the gaming service will join the user in playing the first identified instance of the game with an open player slot. As a further alternative, a player can host a new game by selecting an option to "Create a Game" and thereby specify options within the game that control the way the game will be played and can specify whether the game will be only open to players on the user's friends list.

The XBOX LIVE online gaming service enables each player who has subscribed to the service to create a "friends list" of other subscribers to the service. The friends list is stored by the XBOX LIVE gaming service and is accessible by the player each time that the player signs onto the gaming service. Each player included in the friends list is identified by that player's unique Gamertag, which was selected by that player when first signing up as a new subscriber to the gaming service. When a player views the friends list after signing onto the gaming service, icons next to each Gamertag indicate whether a friend is currently online and whether a friend is using a voice communication module. If a friend's Gamertag is selected in the list, the game that the selected friend is playing is indicated, as well as the progress of the selected friend within the game and whether there are empty slots for any other players in the game. Selecting the Gamertag of a friend for some games also causes the display of stats for the friend's game, such as the current score, time remaining to finish play, etc.

Currently, to join a friend in playing the game in which the friend is playing, a user must select the friend's Gamertag, access the friend's options within a menu, select the option to join the friend's game, and then press a control key on a game console controller to initiate joining in playing the friend's game. Thus, there are several steps that must be carried out by a user to join in playing the game in which a friend is playing. Clearly, it would be preferable to enable a user of an online gaming service to immediately join a friend in playing a game by making a single control selection. It should not be necessary for a user to take multiple steps to accomplish this task. Furthermore, if the user wants to join a specific friend on a friends list in playing an online game, the user should only be required to select the friend (e.g., the friend's Gamertag) and activate a single control. The gaming service should respond to these control actions by immediately joining the user in the instance of the game being played by the friend.

SUMMARY OF THE INVENTION

The present invention addresses the problems noted above, in regard to joining a friend in playing a game by enabling a user to selectively activate a single control and thereby be immediately joined in playing an online game with a friend. Depending upon when the option is activated, the user will either be joined with the first player in a list of the user's friends who is playing the online game, or alternatively, will be joined in playing the online game with a specific friend selected by the user from the friends list. This function is thus carried out much more efficiently than was previously done.

More specifically, the present invention is directed to a method for enabling a user who has signed onto an online gaming service over a network, to immediately join play of an online game in which a friend is playing. The method includes the step of indicating a control that is selectively activatable by the user to immediately couple the user with an instance of the online game in which a friend is playing. A list of friends of the user is provided and the friends on the list are determined by the user. This list indicates whether a specific friend is currently playing the online game. In response to the user activating the control that was indicated, the user is immediately connected to the instance of the online game in which the friend is playing, so that the user can participate in playing the game.

As noted above, the user can select a specific friend who is playing the online game before activating the control to join in the play. To facilitate the selection, the software displays the list of friends to the user, enabling the user to select a specific friend playing the online game from the list before activating the Quick Join control.

Alternatively, in response to the user selectively activating the Quick Join control, the software can automatically search for a first friend within the friends list who is playing the online game. Once a first friend in the list who is playing the online game is found, the user is immediately connected to the instance of the online game being played by the first friend.

Preferably, the control that is to be activated to quickly join a friend in playing an online game is indicated to the user on a screen after the user has signed onto the gaming service. Also, a user's friends list is transferred from the gaming service to a game console of the user when the user signs onto the gaming service and is thus available on the game console to facilitate the Quick Join function of the present invention.

The software comprising the online game that is loaded by the user into the user's game console indicates the control that can be selectively activated by the user to immediately couple the user in communication with an instance of the online game. Games previously published for play on XBOX LIVE™ do not refer to any control for quickly joining a friend in playing an online game.

When connecting the user to an instance of the online game using the Quick Join function, the user may be placed in a lobby or other portion of the online game being played by the friend that displays setup options related to playing the online game for selection by the user. Or, depending upon the nature of the game, the user may be immediately placed in play within the instance of the online game.

The control for immediately connecting to an online game being played by a friend is initially provided to the user immediately after the user has signed onto the gaming service. In addition, the control is made available if the user selectively chooses to view the list of friends, enabling the user to first select a friend who is playing the online game from the friends list before selectively activating the control. Each friend in the friends list of the user is indicated by a Gamertag that is unique to the friend.

Another aspect of the present invention is directed to a memory medium on which are stored machine readable instructions for carrying out the steps of the method discussed above. Yet another aspect of the invention is directed to a game console that enables a user who has signed onto an online gaming service over a network, to immediately join play of an online game in which a friend is playing. The game console includes a network interface that is adapted to couple the gaming console to a network for communicating with the gaming service and with other game consoles. A display interface adapted to couple to a display is provided for displaying graphic and textual data. In addition, a user input device is included for input and control of online games being played using the game console. The game console includes a memory that stores machine instructions. A processor is coupled to the network interface, the display interface memory, the user input device, and the memory and executes the machine instructions stored in the memory to carry out a plurality of functions that are generally consistent with the steps of the method for implementing the Quick Join function discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
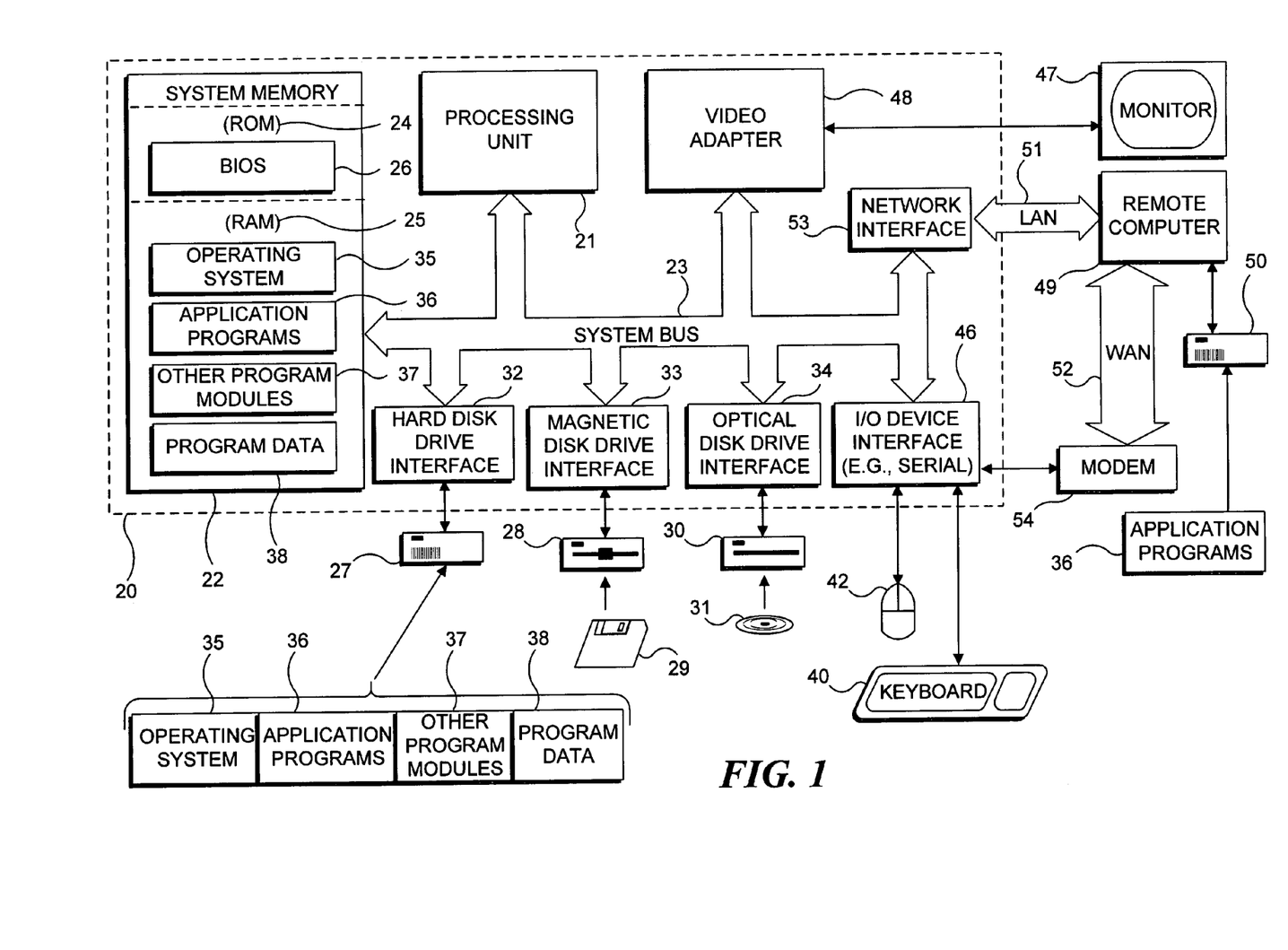
FIG. 1 is a functional block diagram of a generally conventional computing device or personal computer (PC) that is suitable for use as a server on gaming service used in practicing the present invention.

With reference to FIG. 1, an exemplary system suitable for providing the functionality of a server on a gaming service such as Microsoft Corporation's XBOX LIVE™. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

PC 20 can operate in a networked environment using logical connections to one or more remote computers, such as a remote computer 49. Remote computer 49 may be another PC, another server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such network environments are common in offices, enterprise wide computer networks, intranets, and the Internet.

When used in a LAN networking environment, PC 20 is connected to LAN 51 through a network interface or adapter 53. When used in a WAN networking environment, PC 20 typically is coupled to a modem 54, or other means, such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. The servers employed to provide the gaming service functions will thus typically comprise computing devices much like that described above, and will likely access relatively large hard drives or other non-volatile memory systems for storing data about subscribing users and for other elements of the gaming service.

Exemplary Game Console

Figure 2:
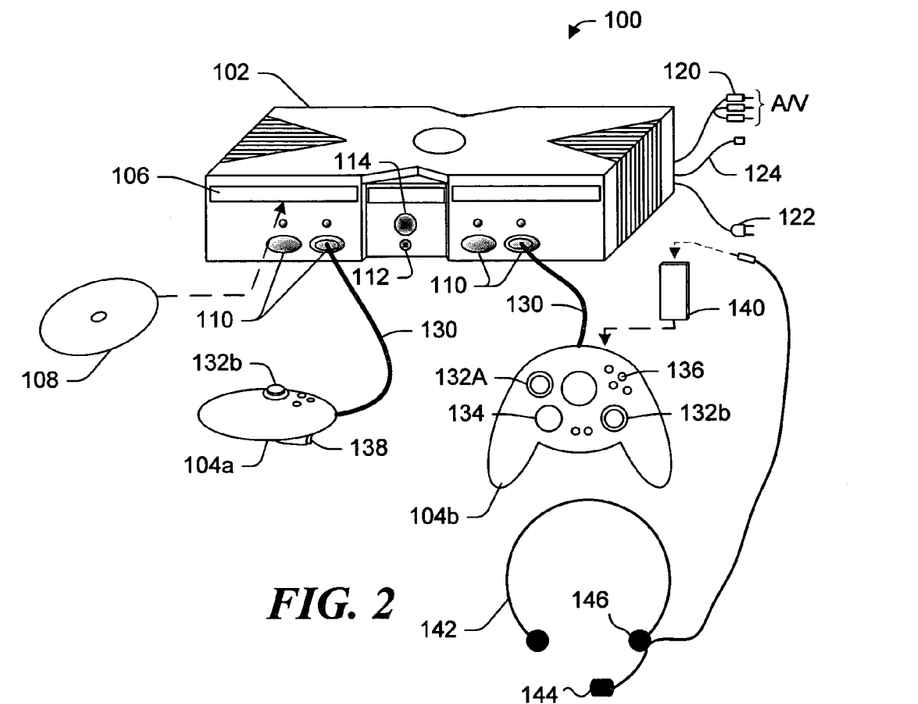
FIG. 2 is an isometric view of a game console used in playing online games by connecting to a gaming service, and illustrating voice communication accessories that are often employed when playing online games that may use the present invention.

As shown in FIG. 2, an exemplary electronic gaming system 100 includes a game console 102 and support for up to four user input devices, such as controllers 104a and 104b. Game console 102 is equipped with an internal hard disk drive (not shown in this Figure) and a portable media drive 106 that support various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network, or through a wireless connections, and/or through a broadband connection to the Internet. Alternatively, it is contemplated that a modem (not shown) may be employed to transfer data to a network and/or the Internet. As yet a further alternative, the game console can be directly linked to another game console via an Ethernet cross-over cable (not shown).

Each controller 104a and 104b is coupled to game console 102 via a lead (or in another contemplated embodiment, alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used in addition to those shown in FIG. 2, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. The voice communicator capability might alternatively be included as an integral part of a controller (not shown) that is generally like controllers 104a and 104b in other respects.

The controllers illustrated in FIG. 2 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disk 108 in drive 106, or from an online source, or from a function unit or module.

It must be emphasized that as supplied, game console 102 is incapable of browsing the Internet or connecting to Web addresses that display Web pages defined by any form of hypertext markup language (HTML). Instead, it can only connect to a dedicated gaming service that has been setup to communicate with the game console over the Internet and to facilitate multiplayer games by subscribers to the service who connect through game consoles that are registered with the gaming service. Each connection over the Internet is through a VPN tunnel, so that the communications between the game console and the gaming service are secure. The game console is not currently provided with a conventional keyboard, an entry of text messages or other text input is possible only by selecting alphanumeric characters from a display using one of the controllers. The game consoles do not have direct communication with parties outside of the environment for playing multiplayer games that is provided by the gaming service. Similarly, anyone who is not connected with a game console in the gaming environment cannot have direct communication with those who are connected to the gaming service.

Functional Components of the Game Console

Figure 3:
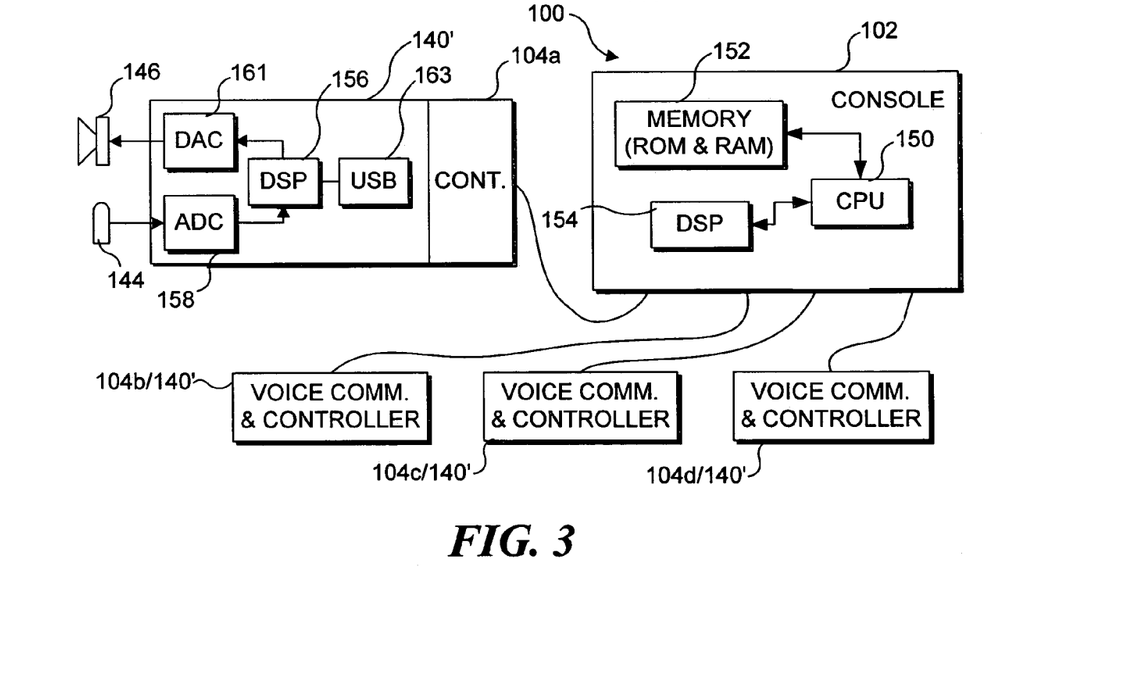
FIG. 3 is a functional block diagram of game console and voice module like those shown in FIG. 2.

Turning now to FIG. 3, a functional block diagram illustrates, in an exemplary manner, components of the game console and the components that are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a. In a current preferred embodiment, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal into a corresponding digital signal. The digital signal from ADC 158 is input to DSP 156 for further processing, and the output of the DSP is applied to USB interface 163 for connection into controller 104a. In this embodiment, voice communication module 140' connects into the functional unit or module port on controller 104a through a USB connection (not separately shown). Similarly, digital sound data coming from game console 100 are conveyed through controller 104a and applied to USB interface 163, which conveys the digital signal to DSP 156 and onto DAC 161. DAC 161 converts the digital signal into a corresponding analog signal that is used to drive headphone 146.

With reference to multiplayer game console 100, several key functional components are shown, although it should be understood that other functional components are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104a to CPU 150, which handles encoding of the voice stream signal for transmission to other local voice communication modules and to other game consoles over a broadband connection through an Ethernet port (not shown in FIG. 3) on the game console.

Alternatively, DSP 156 in voice communication module 140' can be employed to encode the digital signal produced by ADC 158 in response to the analog signal from microphone 144. The encoded data are then conveyed through controller 104a to CPU 150, which again handles transmission of the encoded data to other local voice communication modules and other game consoles over the broadband connection on the game console.

Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163. Data and verbal communications over the Internet between players participating in a multiplayer game through the gaming service are not accessible by others who are simply connected to the Internet via a PC or other type of general computing device, because these communications are conducted through the VPN tunnels that are relatively secure.

Gaming Environment

Figure 4A:
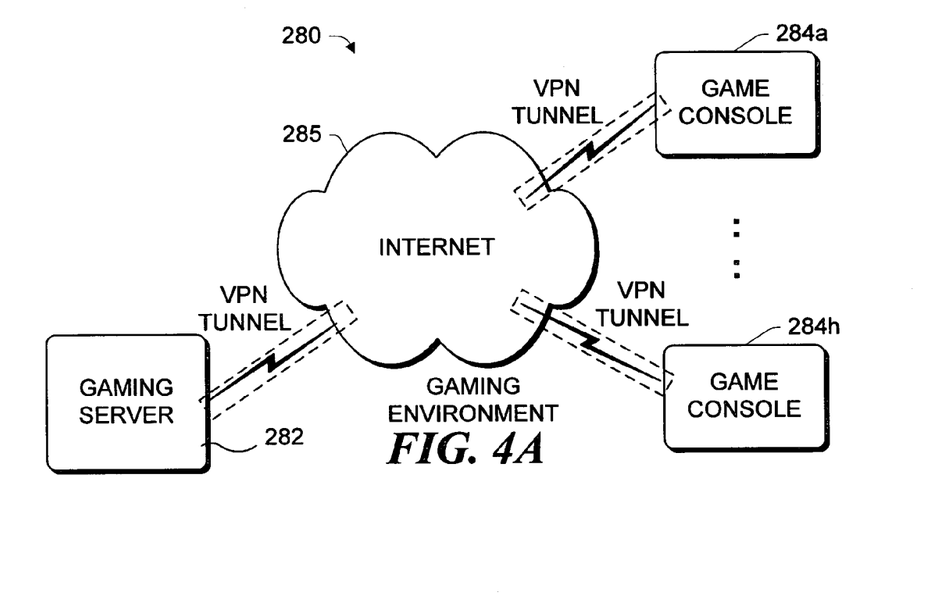
FIG. 4A is a schematic diagram illustrating how a plurality of game consoles are connected in communication over the Internet, through a gaming service implemented by a gaming server.
Figure 4B:
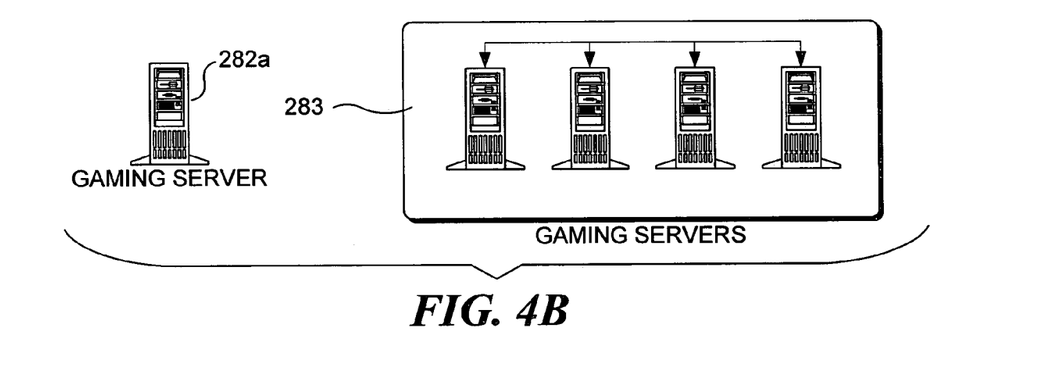
FIG. 4B is a schematic diagram illustrating a game server that is one of a plurality of game servers used for implementing the gaming service.

FIGS. 4A and 4B illustrate different aspects of the gaming environment. In FIG. 4A, a schematic diagram 280 shows that the gaming environment comprises a plurality of game consoles 284a-284h, which are connected to a gaming server 282a. Data packets are conveyed between the gaming server and the game consoles through VPN tunnels, over Internet 285. Each game console 284a-284h is thus connected in secure communication with gaming server 282, which as shown in FIG. 4B may comprise a single server 282a, or alternatively and more likely, will include a plurality of servers 283 that are coupled together to carry out specific functions required for the gaming service. Use of the VPN tunnel insures a secure communication link between each game console and the gaming service. The secure gaming environment of FIG. 4A does not provide any option for connecting a game console over the Internet to any other device and only permits communication between game consoles that are connected to the gaming service, to enable the game consoles to participate in multiplayer games. Although a game console can conduct certain administrative functions such as subscribing, selecting passwords, and indicating other players with whom a person using the game console wants to participate in a multiplayer game, the game consoles are unable to communicate over the Internet outside the gaming environment defined by FIG. 4A. Thus, a game console of this type cannot connect with a Web page using an HTML Web browser, as is possible on a PC or other general computing device that has an Internet connection.

Automated Quick Join to a Game Being Played by any Friend

In order to use Microsoft Corporation's XBOX LIVE™ online gaming service, the user must own a XBOX™ game console, like that described above, and must have subscribed to the online gaming service. However, it is not intended that the present invention in any way be limited to the specific gaming service provided by Microsoft Corporation, or to use of the XBOX™ game console for playing online games. Instead, it is contemplated that the present invention is generally applicable to any gaming device that connects through a network in communication with other players to engage in the play of a multiplayer online game. However, since a first commercial embodiment of the present invention will be used in the XBOX LIVE™ gaming service, an exemplary use of the present invention in that connection is described below.

Typically, to initiate a connection to XBOX LIVE™ to play an online game, a user will insert a game software DVD disc into the DVD drive on the game console. As shown in a flowchart 290 in FIG. 5, when the online software initially boots up on the user's game console, the user will have the option to sign into the online gaming service to play the game with other players online. Assuming that the user wants to do so, the user will then sign into the online gaming service which will cause a main user interface 292 to be displayed to the user, giving several different options from which the user by select enjoining an instance of an existing instance of the game being played on the online gaming service. If the user simply wants to join any instance of the game and doesn't care about the people who are currently playing it, the level being played, or other preferences, the user can select a QuickMatch option 294. Alternatively, if the user prefers to set options for selecting an instance of the game in which the user will play, an OptiMatch 296 can be selected. The present invention adds yet a third option from which the user may selectively choose to implement the present invention. The third option is a Quick Join option 298, which if selectively activated by the user at this point will find the first instance of the game being played by any friend on user's friends list.

The friends list includes Gamertags for other online game players that the user wants to be on the friends list. These friends are thus identified on the friends list by their Gamertags, which are unique and are selected by each online subscriber when initially subscribing to the online gaming service. The user may know a Gamertag of a friend through social contact with the friend in the "real world" (i.e., outside of the online gaming service). Alternatively, the user may identify another player believed to be compatible, who the user would like to add to the user's friends list. Friends are also added user's friends list if another player sends a request to the user to add the user to the other player's friends list and the user agrees. Thus, each player appearing on the user's friends list also includes the user on that player's friends list.

Figure 5:
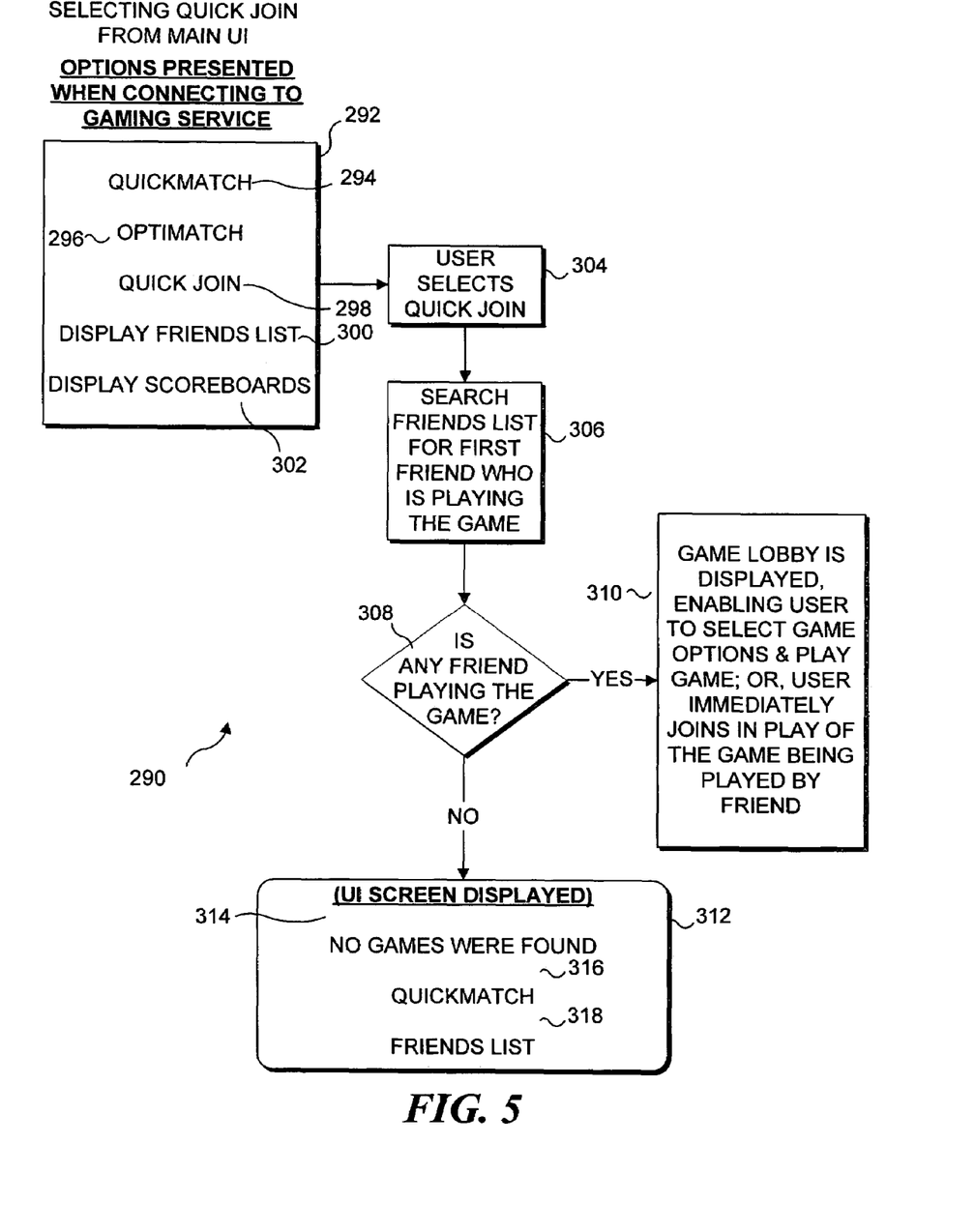
FIG. 5 is a flow chart illustrating the logical steps implemented when enabling a user to be automatically joined to a first friend identified in the user's friends list who is online and playing an instance of an online game.

While the user may be satisfied in simply being quickly joined to any instance of the online game being played by any friend who is included in the user's friends list, the user may instead prefer to select a specific friend who is currently online and playing the game to quickly join in playing the game. If so, the user can select an option 300, which displays the friends list of the user. Further details regarding the use of that option are explained below. A final option available to the user is to selectively display Scoreboards for the game by selecting an option 302. Selecting this option will cause the online gaming service to send the Scoreboards to the user for display so that the user can see the Gamertags of the players who are currently in the lead in the Kudos accumulated in playing the game (this option is game specific).

As indicated in a step 304, if the user selects Quick Join option 298, the game console automatically searches the user's friends list to identify the first friend who is playing an instance of the online game, as indicated in a step 306. A decision step 308 determines if any friend has thus been identified as currently playing an instance of the game. If so, the user is immediately joined to that game. Depending upon the game, the user may be immediately joined in playing the game that was being played by the first friend identified in the friends list. In some games, such as Microsoft Corporation's Project Gotham Racing 2™ auto racing game in which the present invention will first be included, the user will be joined to a lobby of the friend's game, and a lobby screen will be displayed to the user to enable the user to select game options so that the user is prepared to play the game at the next available opportunity, i.e., to participate in the next race that is run. Following step 310, the user is automatically involved in playing the game, or will be able to play the game with the user's friend when the next round starts. Assuming that the user has made the necessary choices in the lobby, the user will be a participant in the next auto race that is run. Clearly, it would not be practical for a user to be immediately joined in playing some types of games, such as the Project Gotham Racing 2™ auto racing game. However, in other types of games, it will be practical to immediately join the user in playing the game, and the user must be prepared, with game control in hand, to take any appropriate action as required by the game to which the user has been quickly joined.

If no friend has been identified as playing the game, a user interface screen 312 is displayed to the user. On this screen, a line 314 indicates that no games being played by a friend on the friends list were found, thereby advising the user that Quick Join cannot currently be implemented. The user is also then provided the option of selecting a QuickMatch 316, or of displaying the friends list by selecting an option 318. (please be aware that what you just listed is not in our game at this moment and will probably not be there at ship)

Figures 6, 7:
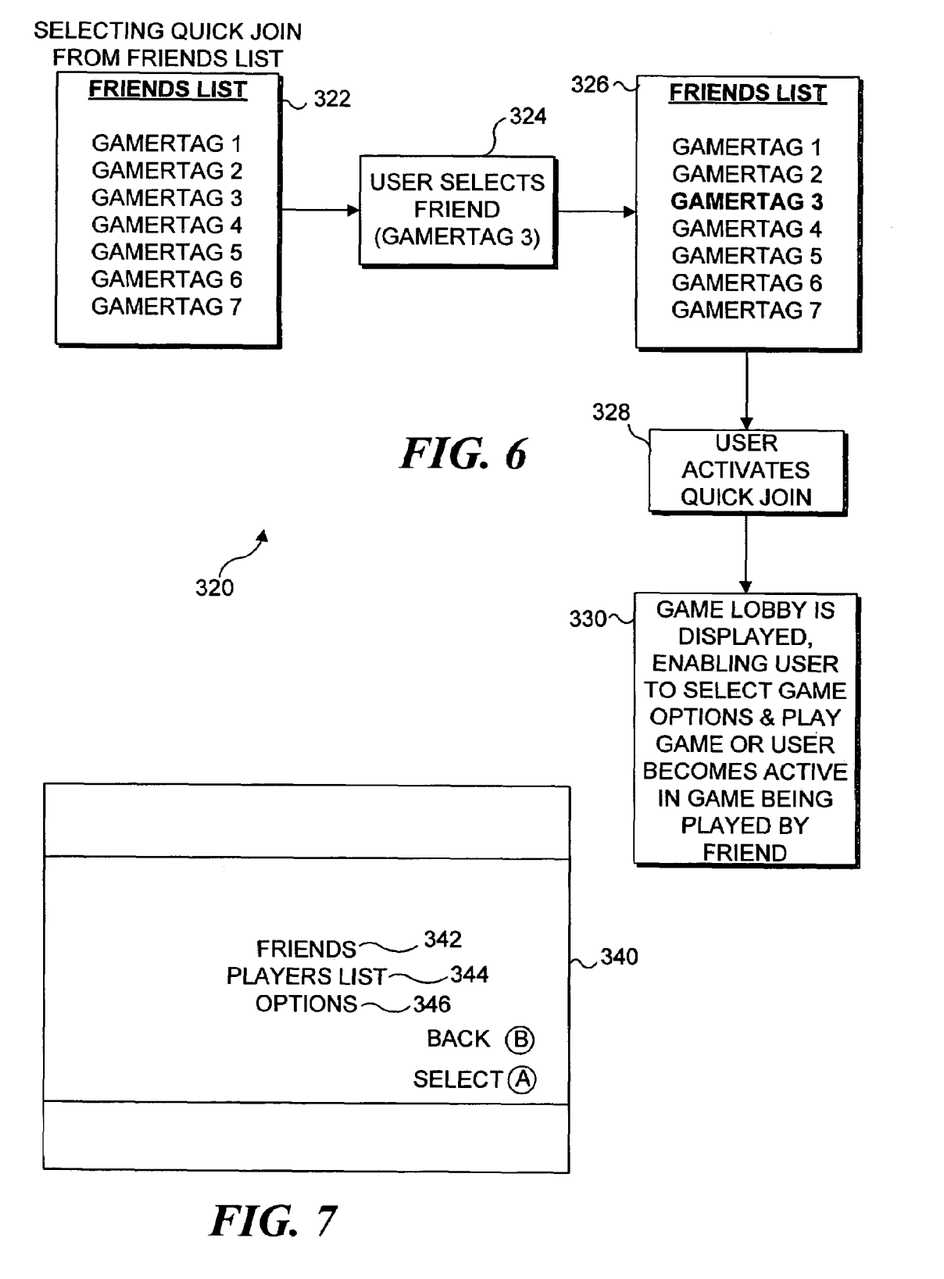
FIG. 6 is a flow chart illustrating the logical steps implemented when a user selects a specific friend who is playing an online game, before selectively activating the Quick Join feature, to be joined in playing the online game with the friend.
FIG. 7 is an exemplary screen showing the menu that is presented after a user has signed onto the gaming service.

FIG. 7 illustrates an initial screen 340 that the user sees after signing on to the gaming service and pressing Y to select "Xbox Live Options." As noted in this Figure, the user can selectively choose to display the user's friends list by selecting an option 342, or can display the players currently playing the game as well as the last ten players who have played the game by selecting an option 344. (Also this option is displayed to enable a user to select a player and ask the player to become a friend who will be added to the user's friends list, submit feedback about a selected player, or mute a selected player during a game). Furthermore, the user can select an option 346 to display a further list of parameters that can be set with regard to online game play. This screen also identifies the control buttons on the game console controller that the user can select to go back or to select an item.

FIG. 6 illustrates steps employed when a user decides to choose a particular friend from the user's friends list and employ the Quick Join feature of the present invention to begin playing an instance of the online game with the selected friend. A friends list 322 is displayed when the user selects option 342 in FIG. 7. Friends list 322 identifies the friends of the user who have been added to that user's list as explained above. These users are each referenced by the Gamertag that they selected when subscribing to the online gaming service. In the drawing Figure, actual Gamertags are not listed. Instead, Gamertag 1 through Gamertag 7 are listed. In a step 324 the user selects a specific friend from the user's friends list. In this example, the user has selected Gamertag 3, identifying the friend associated with Gamertag 3. Once a specific friend has been selected, the Gamertag of the selected friend is highlighted, as shown in a friends list 326. Next, in a step 328, the user activates Quick Join by selecting a control on the game console controller (which as identified in this example, is done by pressing control button "Y" on the hand held game console control).

Once the user has selectively activated the Quick Join feature, the user is immediately joined to the instance of the online game being played by the selected friend, i.e., the friend identified by Gamertag 3 in this example. The game designer will determine at which point a new player joining the game will be placed within the game.

Figure 8:
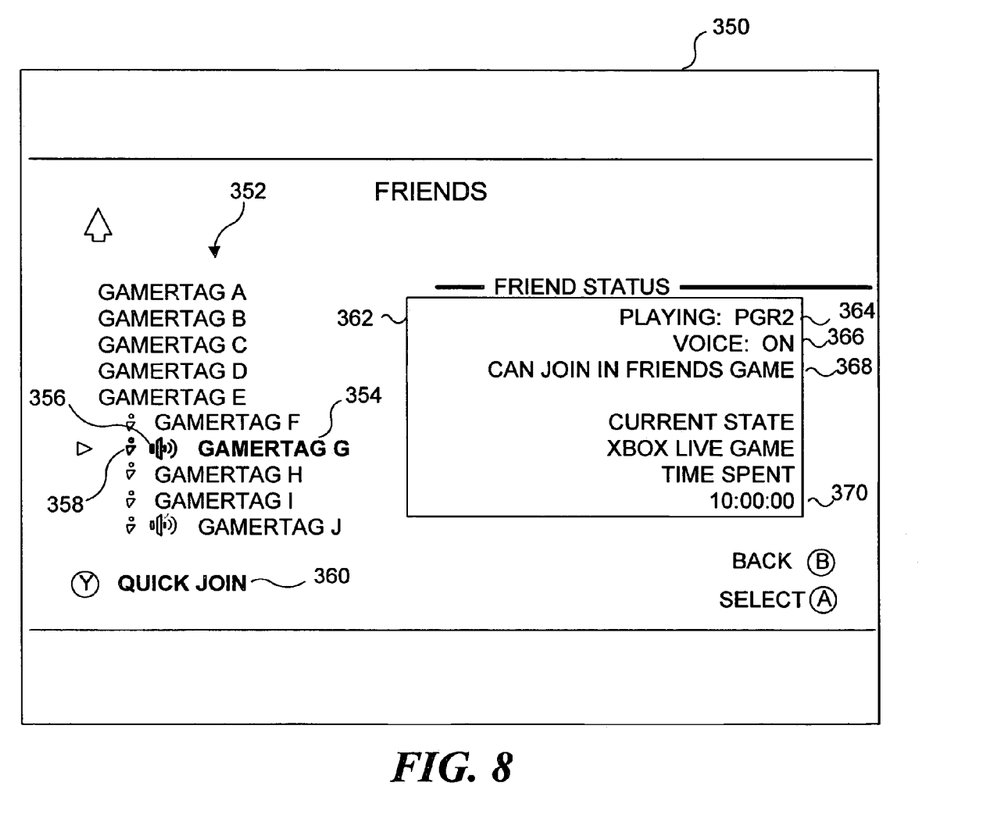
FIG. 8 is an exemplary screen showing the information displayed when a specific friend who is playing an online game is selected.

FIG. 8 illustrates further detail showing how the user can select a specific friend from the user's friend list, and determine further information about the friend before deciding to selectively activate Quick Join. As shown in a user interface screen 350, a list of friends 352 is presented to the user that displays the Gamertags for the friends included in the list. In this example, the user has selected the friend referenced by Gamertag 354. Adjacent the Gamertag of the selected friend is disposed an icon 356, which indicates that the friend who has been selected has the ability to hear and to speak to other players using the voice module option. Furthermore, the status of this symbol indicates that the voice option is currently activated. Also, an icon 358 indicates that the player is online.

Upon selecting a friend referenced by a Gamertag, additional information about the status of the friend is obtained from the online gaming service and displayed to the user. For example, information concerning the player referenced by Gamertag 354 that has been selected is displayed in a friend status box 362. A line 364 in this box indicates that the selected player is playing the game Project Gotham Racing 2™. A line 366 confirms that the selected player can verbally communicate using the voice module, and a line 368 indicates that the user is able to join in the selected friend's game. Furthermore, a line 370 indicates the time that the selected friend has been playing the online game.

Having reviewed the status of the friend, the user can immediately be joined in playing the instance of the game in which the selected friend is playing simply by activating Quick Join as indicated in a line 360 on this screen. The user will then immediately be joined in that instance of the game being played by the selected friend, as discussed above.

As explained in regard to this example, since the selected friend is playing in the online game entitled Project Gotham Racing 2™, it is not practical to immediately join the user in an auto race that is currently in progress. Accordingly, the user is joined to the lobby of Project Gotham Racing 2™ as indicated in a screen 380 shown in FIG. 9. Screen 380 includes a list 382 identifying the players who are currently participating in this instance of the game, referenced by their Gamertags. This list includes additional information such as an icon 386 indicating that the player associated with a Gamertag N does not have a voice peripheral active. That player can hear the voices of other players through the system speakers, but cannot speak to the other players. As already explained, an icon 388 indicates that the selected player identified by Gamertag G has a voice peripheral and that the voice option is turned on. Also, this player is identified as the host of this instance of the game. Furthermore, the open slots remaining in the game 390 are also indicated. In Project Gotham Racing 2™, players can earn kudos (i.e., points related to the style and panache with which a player drives a car during a race). Accordingly, the lobby includes a listing 394 of the kudos rank achieved by each of the currently participating players. The vehicles that each player has chosen to drive in the online game are identified in a list 396. A location 398 for the current auto race indicates that the race is being run in Barcelona and there are 25 laps in the race.

Figure 9:
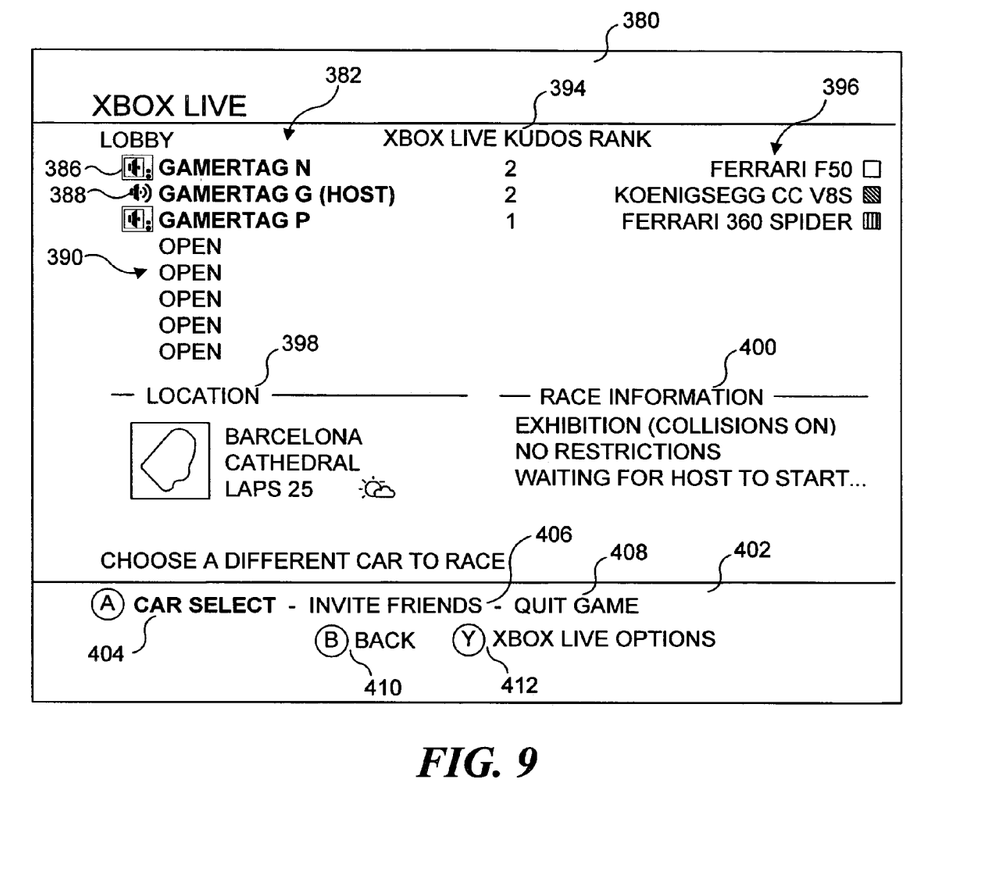
FIG. 9 illustrates a screen within a racing game to show how activation of the Quick Join feature has caused the user to be joined to an instance of the game being played by a selected friend and placed within a lobby of the game where the user can select options that relate to participating in the online game.

Further game options that have been selected by the host are listed under race information 400. For example, the host has chosen to run the race as an exhibition, which allows the players to enable or disable collisions between cars. In this example, a race has not yet been started and the race information indicates that the players are waiting for the host to start. The player who has just been joined to this instance of the game can choose a car to race and can select other options, as indicated in a section 402 of the lobby screen. To select a car, the new player would activate control button 404 labeled "A" on the game console control. Other selections that can be made include an option 406 to invite other friends to join the game, an option 408 to quit the game. By selecting control button 410 labeled "B," the player can go back to the previous screen and can call up XBOX LIVE options by selecting a control button 412 labeled "Y."

Since use of the Quick Join function in accord with the present invention provides the opportunity for a player to immediately be joined into the game being played by a friend, or alternatively by a specific selected friend appearing on the user's friends list, the present invention provides a much more efficient technique to join a friend in playing an online game. By providing the option to activate the Quick Join feature at two different points within the game, it is possible for the user to be automatically joined in playing the game with the first person who is playing the game identified on the user's friends list, or alternatively, to select a specific friend with whom the user wishes to play the game.

While not implemented in a current preferred embodiment of the present invention, it is contemplated that a user might be enabled to selectively sort the user's friends list based upon skill level or some other parameter, which would bias the selection of the friend with whom the user is quickly joined, if the user chooses to be joined in playing the game with the first friend within the friends list who is found playing the game. Although this option has not yet been implemented, it will be apparent that this and other modifications to a preferred embodiment disclosed above are readily achievable with the present invention.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a computer gaming network that includes one or more gaming servers connectable through a network with a plurality of game consoles, a method of enabling a user of one of the game consoles to immediately join, at the user's option and without the user having to first access any particular gaming friend's online status, any of a plurality of the user's remote gaming friends in playing an online game, the method comprising steps for:

a user of one of the game consoles first logging online so as to access a gaming server in order to join in playing a selected game online;

the gaming server then causing a user interface to be displayed to the user at the user's gaming console, the user interface presenting a plurality of options for initiating or joining in an online game for the selected game, at least one of said options comprising a quick join option which, when selected by the user, in turn causes the gaming server to perform steps for:

automatically causing the gaming server to launch a search of a friends list previously created and stored for the user in order to find the first friend in that list who is online playing the selected game; and         thereafter, either i) enabling the user to select game options prior to joining in the online game, or ii) permitting the user to immediately join the first friend in playing the online game that is going on.

2. In a computer gaming network that includes one or more gaming servers connectable through a network with a plurality of game consoles, a computer program product comprising a computer-readable storage medium containing computer-executable instructions for implementing within the gaming network a method of enabling a user of one of the game consoles to immediately join, at the user's option and without the user having to first access any particular gaming friend's online status, any of a plurality of the user's remote gaming friends in playing an online game, and wherein the method is comprised of steps for:

a user of one of the game consoles first logging online so as to access a gaming server in order to join in playing a selected game online;

the gaming server then causing a user interface to be displayed to the user at the user's gaming console, the user interface presenting a plurality of options for initiating or joining in an online game for the selected game, at least one of said options comprising a quick join option which, when selected by the user, in turn causes the gaming server to perform steps for:

automatically causing the gaming server to launch a search of a friends list previously created and stored for the user in order to find the first friend in that list who is online playing the selected game; and         thereafter, either i) enabling the user to select game options prior to joining in the online game, or ii) permitting the user to immediately join the first friend in playing the online game that is going on.

3. The method of claim 1 or 2, wherein a friends list of the user is transferred from the gaming server to a game console of the user when the user signs onto the gaming server.

4. The method of claim 3, wherein each friend in the list of friends of the user is indicated by a Gamertag that is unique to the friend.

5. The method of claim 1 or 2, wherein the online game that is loaded by the user into the gaming console of the user carries out the step of causing the game console to access the UI with the quick join option that can be selectively activated by the user to immediately couple the user in communication with an instance of the online game.

6. The method of claims 1 or 2, wherein the step for enabling the user to select game options prior to joining in an online game comprises a step for opening a screen within the instance of the online game displaying options related to playing the online game.

7. The method of claims 1 or 2, wherein the step for enabling the user to select game options prior to joining in an online game comprises a step for opening a screen within the instance of the online game so that the user is immediately playing the online game.

8. The method of claims 1 or 2, wherein the quick join option is made selectively activatable by the user at a plurality of different times after the user signs onto a gaming server to play the online game.

\* \* \* \* \*